May 31, 1949. A. BOOS 2,471,999
CABLE TENSIOMETER
Filed Oct. 30, 1945 3 Sheets-Sheet 2

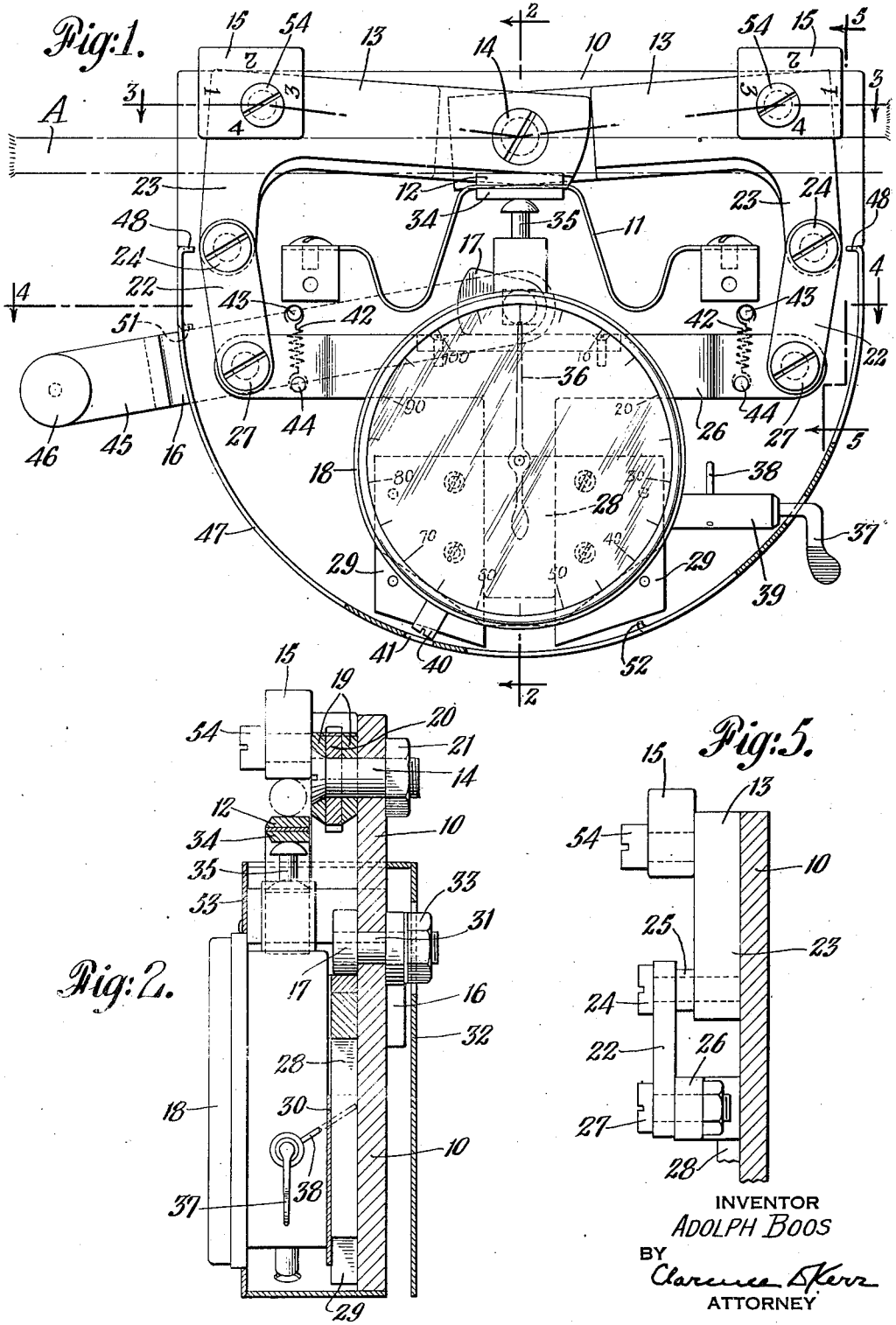

INVENTOR
ADOLPH BOOS
BY
ATTORNEY

May 31, 1949.　　　　　A. BOOS　　　　　2,471,999
CABLE TENSIOMETER
Filed Oct. 30, 1945　　　　　　　　　　　　　　3 Sheets-Sheet 3

INVENTOR
ADOLPH BOOS
BY
Clarence S Kerr
ATTORNEY

Patented May 31, 1949

2,471,999

UNITED STATES PATENT OFFICE 2,471,999

CABLE TENSIOMETER

Adolph Boos, Elmhurst, N. Y., assignor to John Chatillon & Sons, New York, N. Y., a corporation of New York Application October 30, 1945, Serial No. 625,543

9 Claims. (Cl. 73—144)

The invention relates to cable tensiometers.

It is an object of my invention to provide an improved cable tensiometer which is compact and accurate, and which can be used wherever a portable instrument is required for determining the tension in cables and the like.

In the construction and maintenance of aircraft it is of importance that the stays, operating cables, and other rigging be adjusted to the proper tension. The tension is determined by portable, or hand, tensiometers which are applied to the tensioned member during the testing operation. Instruments of this type are calibrated so that the tension is determinable through measurement of the deflection produced in a section of the tensioned member when pressure is applied transversely thereto. Devices operating in this manner have been used heretofore, but such devices have been subject to various disadvantages. One objectionable characteristic has been that during the application of pressure to deflect the cable transversely, the length of the deflected section changes slightly as it is stressed over the supports or risers which mark the end of the deflected section. In certain cases this may produce an appreciable amount of friction between the risers and the cable, and in a cable that is highly tensioned, this friction may have the result of slightly retarding the deflecting action and thus affect the accuracy of the reading obtained. It has been one of the leading objects of my invention to overcome this objectionable characteristic and to provide an instrument in which the frictional effect of the deflecting operation is substantially eliminated, or at least greatly minimized.

Another object has been to provide a cable tensiometer which is so constructed as to enable the employment of a lighter deflecting spring and thus decrease the likelihood of injury to the cable or permanent deformation thereof.

A further object has been to provide an instrument of the class described which will accommodate cables of varying sizes without the employment of separate pieces for adjustment of the size of the cable "slot" between the risers and the spring-supported cable contacting member through which the deflecting pressure is applied.

Other objects and advantages of my invention will appear as the description proceeds.

In the drawings,

Fig. 1 is a face view of a cable tensiometer embodying the invention in a preferred form. In this view the front cover of the instrument has been removed to reveal the mechanism more clearly. The parts are shown in the position which they occupy upon initial application of the device to the cable to be tested and prior to application of the deflecting pressure.

Fig. 2 is a central vertical cross-sectional view of the instrument shown in Fig. 1 taken substantially as indicated at 2—2 in that view but with the dial gauge shown in elevation.

Fig. 5 is a detail elevational view of a portion of the operating mechanism taken as indicated at 5—5 in Fig. 1.

Figure 7:
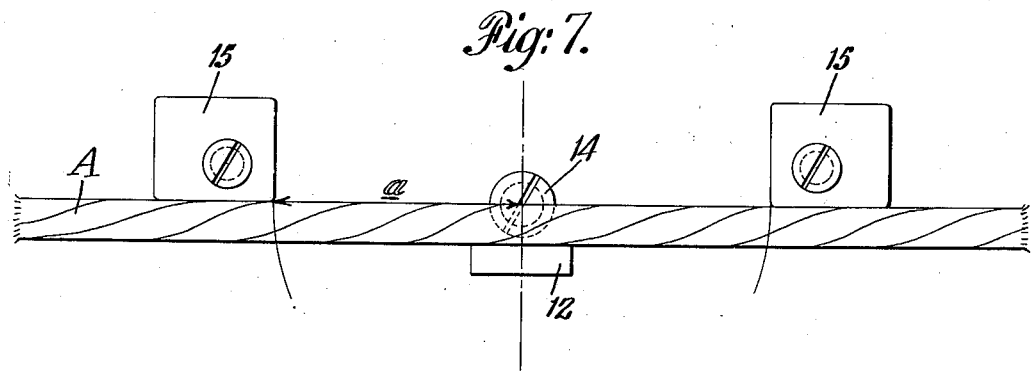
Figure 8:
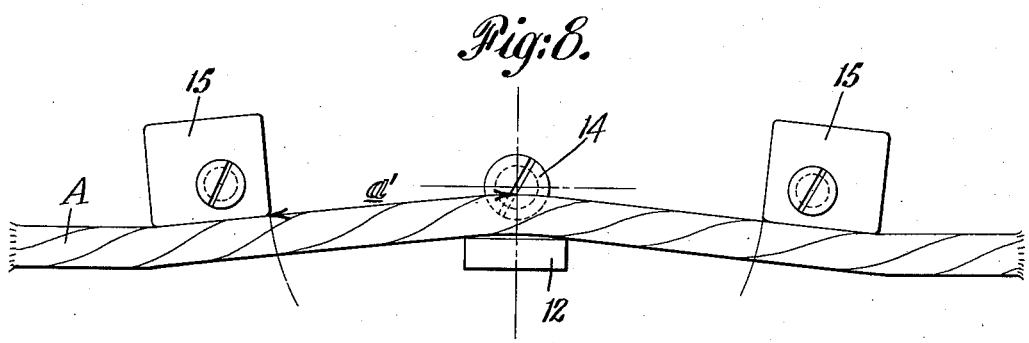

Figs. 7 and 8 are diagrammatic views illustrating the feature of my invention whereby it is possible to maintain a substantially constant length of the deflected section of the cable during the application of the deflecting pressure. Fig. 7 illustrates the relative positions of the risers and pressure pad prior to application of the deflecting pressure, and Fig. 8 shows the positions of these elements while the maximum deflecting pressure is being applied. In Fig. 8 the deflection has been exaggerated slightly in order to assist in conveying a clearer understanding of the invention.

In accordance with the preferred embodiment shown in the drawings, my invention comprises, in its general arrangement, a supporting frame or base plate 10 (Figs. 1 and 2), a spring 11 supported on the frame, a cable-contacting member or pressure pad 12 mounted on the spring, a pair of levers 13 pivotally mounted on the frame adjacent the cable-contacting member as at 14 and extending on opposite sides of the pivot point, pressure elements or risers 15 mounted on the levers, an actuating arm 16 pivoted to the frame, cam means 17 associated with the actuating arm for actuating the levers to bend the cable around the cable-contacting member 12, and a gauge 18 arranged for actuation in relation to the amount of deflection produced in the cable by movement of the pressure elements 15.

Figure 3:
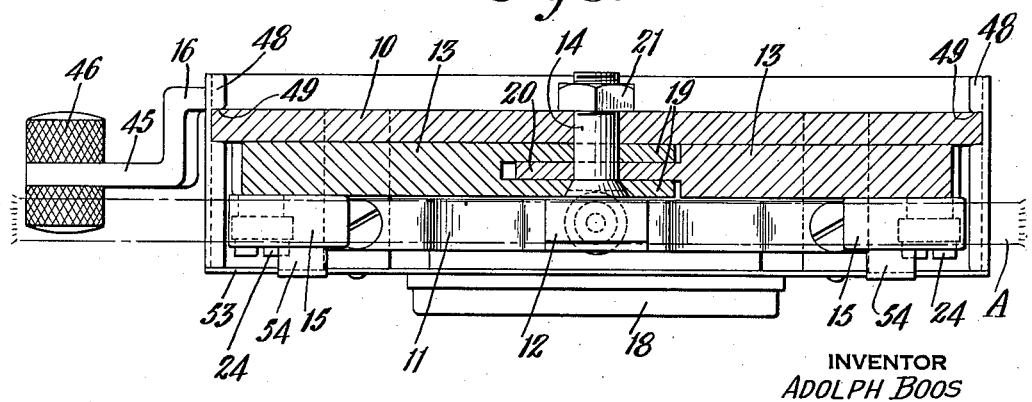
Figs. 3 and 4 are horizontal cross-sectional views of the same instrument taken as indicated at 3—3 and 4—4, respectively, in Fig. 1.

The levers 13 which carry the pressure elements or risers 15 may be of bell crank formation, and they are arranged to overlap one another at the pivot 14. For this purpose, one of the levers may be formed with a bifurcated end 19 (Figs. 2 and 3) and the other with a tongue 20 arranged to extend between the furcations of the first. Pivot 14 may be provided by a screw or bolt passing through aligned apertures in the furcations 19 and tongue 20 of the levers as best shown in Figs. 2 and 3, and be suitably secured by the nut 21.

Figure 4:
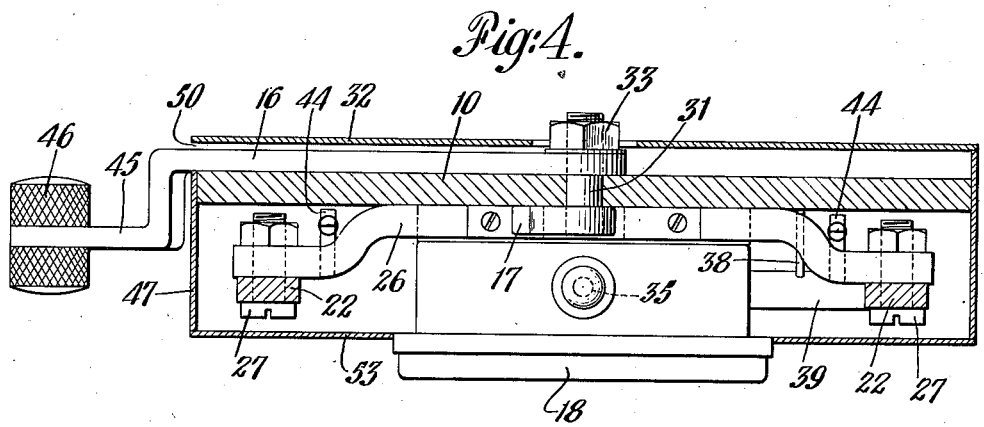

The actuating mechanism for the levers 13 comprises a pair of links 22 pivotally secured to the depending arms 23 of the bell cranks as by means of machine screws 24 with a collar or spacer 25 (Fig. 5) between the links and the arms 23. The other ends of the links 22 are pivotally secured to the ends of the beam 26 as by bolts 27. The ends of the beam 26 are offset as shown best in Fig. 4, providing clearance for the ends of the bolts 27 and their attaching nuts and, further, to provide clearance for other parts to be described. The beam 26 is of T-formation, the depending leg 28 of which is guided for movement in a vertical direction as viewed in Fig. 1, being slidably arranged between a pair of spacers 29 suitably secured to the base plate 10 and, further, being guided between the base plate and a plate 30 (Fig. 2) which overlies and is secured to the spacers 29. The plate 30 also forms a support for the base of the dial gauge 18 previously mentioned.

Actuating arm 16 is pivoted to the base plate 10 as by means of the bolt or stub shaft 31. As shown best in Fig. 4, the operating arm extends between the back of the base plate and the back cover 32 of the instrument. It is fixed for rotation with the stub shaft 31, the latter element for this purpose being provided with a squared portion passing through a similarly shaped aperture in the actuating arm. Also fixed for rotation with the shaft 31 is the cam 17 previously referred to which likewise may be provided with a squared aperture for engagement with a squared part of the shaft. The cam 17 may first be assembled with shaft 31 with a force or drive fit and, after assembly with the base plate, the arm 16 may be secured in place over the squared part of the shaft by means of the nut 33.

The edge of the cable-contacting member 12 preferably is beveled as shown in Fig. 2 to assist in guiding the instrument over the cable to be tested. The compression plate 34 may be similarly tapered in order to obtain interchangeability of parts during manufacture of the instrument.

Figure 6:
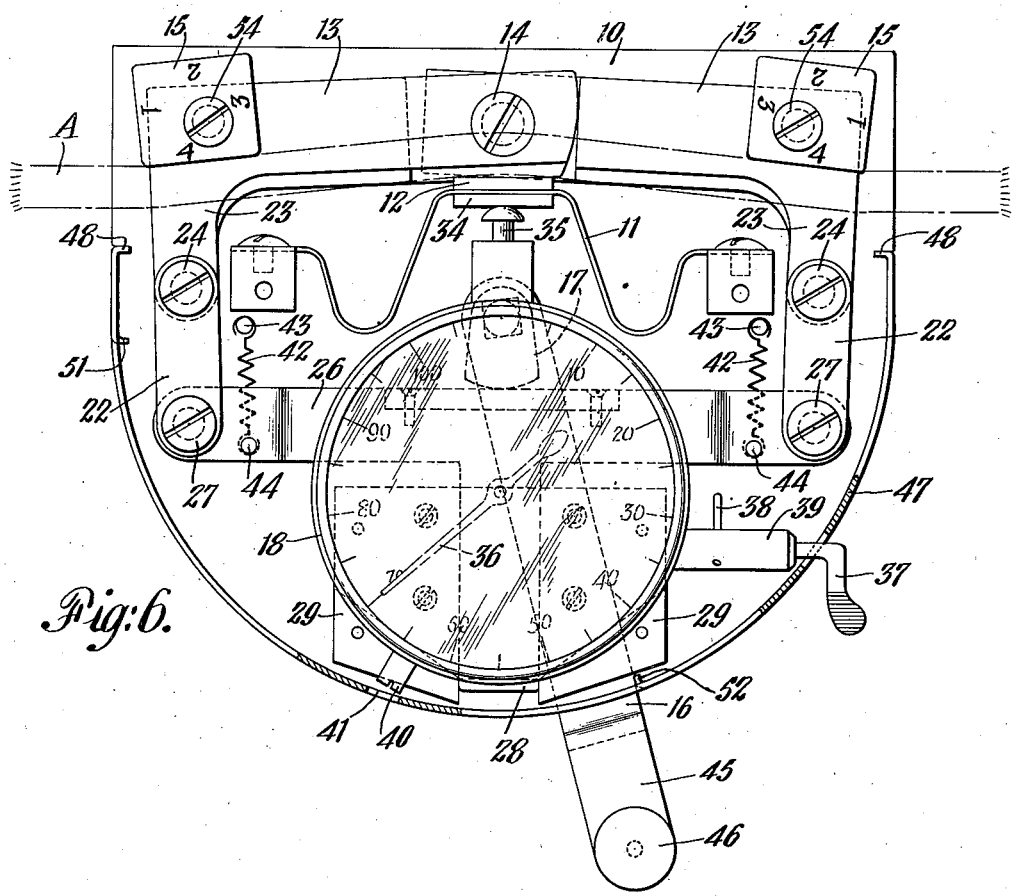
Fig. 6 is a view similar to Fig. 1 but showing the parts in the position which they occupy after the operating lever has been moved into position to apply deflecting pressure to the cable. As in Fig. 1, the cover is removed to reveal the operating mechanism.

Movement of the actuating arm 16 from the position shown in Fig. 1 to the position shown in Fig. 6 forces the beam 26 downwardly and, through the links 22, causes the levers 13 to pivot about their points of attachment to the base at 14 to produce arcuate movement of the spaced pressure elements, or risers, 15. This forces the cable A against the cable-deflecting member or pressure pad 12, bending the cable slightly and at the same time actuating the deflection gauge 18 through contact of the under side of the spring 11—or of the compression plate 34 attached thereto—with the head of the plunger 35 of the gauge. The head of plunger 35 acts as a stop to prevent overloading the gauge or over-stressing of the spring. The deflection gauge may be of any suitable construction, and as gauges of this type are well known and can be purchased on the market, it is unnecessary to describe its mechanism in detail. Essentially, it embodies a light spring actuated by the plunger 35, movement of the plunger being translated into proportional movement of an indicating pointer 36 cooperating with a dial which may be graduated in any suitable units. A calibration chart is prepared which for each size and type of cable gives the relation between the reading of the guage and the actual tension in the cable, expressed in the desired units. As is well known to those familiar with instruments of this type, the data for such a calibration chart may be obtained empirically, and a chart may be prepared and furnished with the instrument so as to enable the user to translate the reading of the guage to express the tension in the particular cable being tested.

At times it is necessary to use instruments of this type in cramped quarters, as when testing the cables in various parts of an airplane where the workman or crewman is required to crawl into tight places in order to obtain the desired readings. In some cases it may not be convenient to read the gauge while the instrument is being operated, so it is preferable to employ a gauge having a stop or arrester lever 37 to hold the indicating needle 36 in its deflected position after the operating arm 16 has been returned to the position shown in Fig. 1 for removal of the instrument from the cable. The arrester mechanism may be of any usual construction such as is to be found on ordinary deflection gauges. A stop pin 38 associated with the coupling 39 of this mechanism is arranged to engage the base plate 10 in its limiting position. After the tensiometer has been removed from the cable and the reading taken, the arrester lever 37 may be turned to release the gauge and permit the pointer 36 to return to its normal, or zero, position.

Upon return of the actuating arm 16 to its released position, which is the position shown in Fig. 1, the beam 26 is returned to its original position by means of the springs 42 which are secured at one end to the base 10 by means of the spring posts 43 and at the other end are fastened to posts 44 fixed to the beam. This carries the links 22 upwardly and returns the bell crank levers 13 to their released position, as shown in Fig. 1.

The lever 16 preferably is offset at its outer end as at 45, and is provided with a knob, or knobs, 46. The offset 45 brings the knob into alignment with the side of the instrument, making it extremely compact. In this connection, it will be observed that the lower part of the instrument case is of semicircular form struck from the center of the actuating arm so that the knob 46 remains close to the side of the instrument case in all positions.

The mechanism which has been described is provided with a suitable case secured to the base plate or frame 10. The side of the case may be formed by a semicircular member 47, the extremities of which are flanged inwardly as at 48 (Figs. 1 and 3). The flanges 48 are notched as at 49 to receive the base plate 10, and the member 47 may be secured to this plate in any suitable manner as, for example, by attachment with screws. The side of the case is notched as at 50 (Fig. 4) to provide for movement of the actuating arm 16, the edges of the notch being flanged as at 51 and 52 (Fig. 1) for engagement with the operating arm in its limiting positions. Front and back covers 53 and 32 are secured in suitable fashion to the side 47 or base 10 as by means of screws and spacers (not shown). The front is provided with an aperture for the dial gauge, and the back cover 32 has an opening through which the bolt 31 and nut 33 project, thus permitting ready detachment of the operating arm 16 and contributing further to the compactness of the instrument.

The risers 15 preferably are of rectangular form and pivoted to their respective lever arms as by means of screws 54 extending through the risers at a point which is eccentrically positioned with reference to the sides of the riser, providing a plurality of cable-engaging surfaces. Thus each side of the riser is disposed at a different distance from the pivot point, giving four positions of adjustment as designated on the face of the riser by appropriate indicia such as "1," "2," "3" and "4." In the number 4 position as shown in the drawings, the instrument is designed to receive a fairly large size of cable. In the number 1 position, obtained by rotating the lefthand riser counterclockwise and the righthand riser clockwise, the cable "slot" is narrowed for reception of the smallest size of cable. The number 2 and number 3 positions of the risers adjust the size of the cable slot for reception of intermediate cable sizes. The pivotal attachment of the risers to the operating levers serves the further purpose of allowing them to remain parallel to the center-line of the cable, preventing injury such as might otherwise be caused by throwing contact to one corner of the risers. This will be understood by a comparison of Figs. 1 and 6, or Figs. 7 and 8.

Referring now more particularly to the diagrams, Figs. 7 and 8, it will be observed that the distance $a$ (Fig. 7) from the inside corner of one of the risers to the center of the pivot 14 is the same as the distance $a'$ (Fig. 8) between the corresponding points. Thus the arcuate movement of the risers or spaced pressure elements 15 about a common center substantially in line with the outer edge of the cable A has the result of maintaining substantially constant length of the deflected section of the cable during the application of deflecting pressure thereto. There may be an infinitesimal difference in the length of the deflected section by reason of movement of the cable-contacting member 12 during the application of the deflecting pressure. Thus the member 12 moves downwardly as the deflecting pressure is applied, bringing the outer edge of the deflected portion of the cable slightly below the center of the pivot 14. However, any such variation in the length of the deflected section is so extremely small as not to have any important effect on the reading obtained in the use of the instrument, and from a practical standpoint, it is permissible to regard the length of the deflected section between the risers as remaining constant. This constancy, as we have seen, is achieved primarily by reason of the arcuate movement of the pressure elements about a center which is closely adjacent the cable, or the outer edge thereof. An important advantage obtained through maintaining this constant length of deflected section is that it eliminates, or substantially eliminates, sliding friction between the cable and the risers during the operation of the tensiometer. This keeps the tension the same inside and outside of the risers. This prevents the obtainment of a reading which would indicate a higher tension than actually is present in the portion of the cable which is outside of the risers. Furthermore, the elimination of sliding friction makes it possible to use a lighter spring for a given cable deflection, which in turn decreases the likelihood of injury to the cable or the production of a permanent deformation in the cable.

A further advantage of my construction resides in the use of a long spring employing the reverse bends which are shown in Figs. 1 and 6. This contributes to long life and permanent accuracy of the instrument.

While in the broad statement of objects I have described the application of my cable tensiometer more particularly with reference to its utility in the construction and maintenance of aircraft, it will be apparent that it has application to the measurement of tension in cables and the like in other types of cable installations as, for example, the guy wires of poles and towers such as radio beacon towers or aerials, and the standing rigging of yachts and other vessels, and so on. The term "cable" as used herein and in the appended claims is not restricted to any particular type of cable. The instrument is applicable to the measurement of tension in single as well as multi-strand wire or cable so that the term "cable" is to be understood as including, for example, a cable or wire consisting of a single strand.

The terms and expressions which I have employed are used in a descriptive and not a limiting sense, and I have no intention of excluding such equivalents of the invention described, or of portions thereof, as fall within the purview of the claims.

I claim:

1. A cable tensiometer comprising a spring-supported cable contacting member, spaced pressure elements mounted for arcuate movement about a common center to bend the cable around the cable contacting member, and a gauge arranged for actuation in relation to the amount of deflection produced in the cable by the arcuate movement of the pressure elements.

2. A cable tensiometer comprising a spring-supported cable contacting member, spaced pressure elements mounted for arcuate movement about a common center substantially in line with the cable to bend the cable around the cable contacting member, and a gauge arranged for actuation in relation to the amount of deflection produced in the cable by the arcuate movement of the pressure elements.

3. A cable tensiometer comprising a spring-supported cable contacting member, a pair of levers pivotally mounted at a single point adjacent said member and extending on opposite sides of the pivot point, pressure elements mounted on the levers, means for actuating the levers to bend the cable around the cable contacting member, and a gauge arranged for actuation in relation to the amount of deflection produced in the cable by movement of the pressure elements.

4. A cable tensiometer comprising a spring-supported cable contacting member, a pair of levers pivotally mounted at a single point adjacent said member and extending on opposite sides of the pivot point, pressure elements mounted on the levers, means for actuating the levers to bend the cable around the cable contacting member, and a gauge arranged for actuation in relation to the amount of deflection produced in the cable by movement of the pressure elements, the pressure elements being pivotally mounted on the levers.

5. A cable tensiometer comprising a spring-supported cable contacting member, a pair of levers pivotally mounted adjacent said member and extending on opposite sides of the pivot point, pressure elements mounted on the levers, means for actuating the levers to bend the cable around the cable contacting member, and a gauge arranged for actuation in relation to the amount of deflection produced in the cable by movement of the pressure elements, the pressure elements having a plurality of cable engaging surfaces and being pivotally mounted on the levers for selective arrangement of the cable engaging surfaces to accommodate different sizes of cable.

6. A cable tensiometer comprising a frame, a spring supported on the frame, a cable contacting member mounted on the spring, a pair of levers pivotally mounted at a single point on the frame adjacent said member and extending on opposite sides of the pivot point, pressure elements mounted on the levers, an actuating arm pivoted to the frame, cam means associated with the actuating arm for actuating the levers to bend the cable around the cable contacting member, and a gauge arranged for actuation in relation to the amount of deflection produced in the cable by movement of the pressure elements.

7. A cable tensiometer comprising a frame, a spring supported on the frame, a cable contacting member mounted on the spring, a pair of levers pivotally mounted on the frame adjacent said member and extending on opposite sides of the pivot point, pressure elements mounted on the levers, an actuating arm pivoted to the frame, cam means associated with the actuating arm for actuating the levers to bend the cable around the cable contacting member, and a gauge arranged for actuation in relation to the amount of deflection produced in the cable by movement of the pressure elements, said cam means comprising a cam mounted for pivotal movement with the actuating arm, a member movable toward and away from the pivot point of the levers by the cam, and links connecting the last-named member to the levers.

8. A cable tensiometer comprising a spring-supported cable contacting member, a pair of bell crank levers pivotally mounted adjacent said member and extending on opposite sides of the pivot point, pressure elements mounted on the levers, means for actuating the levers to bend the cable around the cable contacting member, and a gauge arranged for actuation in relation to the amount of deflection produced in the cable by movement of the pressure elements.

9. A cable tensiometer comprising a spring-supported cable contacting member, spaced pressure elements mounted for arcuate movement about a common center to bend the cable around the cable contacting member while maintaining a substantially constant length of the deflected section of the cable during the application of deflecting pressure thereto.

ADOLPH BOOS.

REFERENCES CITED

The following references are of record in the file of this patent:

UNITED STATES PATENTS

| Number | Name | Date |
|---|---|---|
| 1,031,208 | Thompson | July 2, 1912 |
| 1,631,143 | Matthews et al. | June 7, 1927 |
| 1,871,776 | Chatillon | Aug. 16, 1932 |
| 2,285,471 | Sturgess | June 9, 1942 |